United States Patent [19]

Jacob

[11] Patent Number: 5,051,001
[45] Date of Patent: Sep. 24, 1991

[54] BALL CIRCULATION UNIT FOR A LINEAR BALL GUIDE

[76] Inventor: Werner Jacob, Briandring 29, 6000 Frankfurt/Main 70, Fed. Rep. of Germany

[21] Appl. No.: 505,021

[22] Filed: Apr. 5, 1990

[30] Foreign Application Priority Data

Apr. 8, 1989 [DE] Fed. Rep. of Germany ....... 3911501
Nov. 14, 1989 [DE] Fed. Rep. of Germany ....... 3937781

[51] Int. Cl.$^5$ .............................................. F16C 29/06
[52] U.S. Cl. ...................................................... 384/43
[58] Field of Search ............................ 384/43, 44, 45; 464/168

[56] References Cited

U.S. PATENT DOCUMENTS

| | | | |
|---|---|---|---|
| 4,443,042 | 4/1984 | Walter et al. ........................... | 384/43 |
| 4,469,380 | 9/1984 | Cowles ................................... | 384/43 |
| 4,652,147 | 3/1987 | Geka ..................................... | 384/43 |
| 4,695,170 | 9/1987 | Teramachi ............................. | 384/43 |

Primary Examiner—Lenard A. Footland
Attorney, Agent, or Firm—Toren, McGeady & Associates

[57] ABSTRACT

The invention relates to a ball circulation unit in which ball rows are guided in a multi-component cage. The cage optionally consists of first inner segments and/or second inner segments, and is complemented by head pieces which comprise webs ensuring guidance of the balls in carrying portions of two adjoining ball rows. Designing the cage in this way makes it possible to produce it from plastics applying the injection molding process. The design of the inner segments permits variation regarding the design and arrangement of the ball rows.

16 Claims, 5 Drawing Sheets

BALL CIRCULATION UNIT FOR A LINEAR BALL GUIDE

BACKGROUND OF THE INVENTION

The invention relates to a ball circulation unit for a linear ball guide, which may be moved along a guiding shaft with a circular cross-section at least partially embracing it. The unit has several continuous rows of balls which are distributed across the cross-section and are guided in a cage, comprising a carrying portion in which the balls, from the cage, project radially inwardly while resting on the guiding rail, a returning portion, and deflecting portions connecting the two other portions at their ends. The carrying portion and returning portion each extend parallel to the longitudinal axis and the cage is fixed in the circumferential direction and axially in the basic member.

With such ball circulation units it is known for the balls contained in the carrying rows to be supported on ball races provided in the sleeve. The individual carrying portions are evenly distributed around the cross-section of the guiding rail, and the cage is designed in one piece (see DE-OS 12 62 691). The production of such a cage is expensive.

SUMMARY OF THE INVENTION

It is an object of the present invention to provide a ball circulation unit which may be moved along a guiding rail with a circular cross-section, whose cage is easy to produce and permits variation in and optimization of its design, the number and arrangement of the carrying rows for a given diameter of the guiding rail and of the outer diameter.

In accordance with the invention, this objective is achieved in that the cage is designed in several parts and consists of inner segments representing guiding means for the carrying portions and returning portions and of head pieces attached at their axis ends and comprising the deflecting portions. The inner segments, in the circumferential direction, on both sides, comprise an axially extending guiding recess of a carrying portion and, therebetween, one or two guiding grooves form one or two returning portions. The head pieces and inner segments are centered relative to each other.

Separating the inner segments and head pieces permits the use of simple production tools because the joint is in the region of the carrying rows. The inner segments and head pieces may, in consequence, be easily produced from plastic, applying the injection molding process.

A further advantage of such a design is that it is possible to select an arrangement where at least two carrying portions are arranged in the circumferential direction of the guiding rail with the smallest possible distance between them and that the load may be introduced into the guiding rail in this direction. As a result, especially if the sleeve has a slotted design, there exists only a low force component which does not cause the sleeve to expand.

It is also possible for several ball rows to be circumferentially distributed in pairs on the cross-section of the guiding rail. Such an arrangement has to be selected depending on which directions or main directions the force is introduced. The ball circulation unit may be aligned in such a way that the directly adjoining carrying portions, spaced with the smallest possible distance between them, are arranged symmetrically relative to the direction of force.

The two types of inner segments permit different combinations. It is possible to provide ball circulation units with different numbers of ball rows. In a first embodiment, the cage comprises only inner segments with one guiding groove. In a second embodiment, the cage only comprises inner segments with two guiding grooves and head pieces with formed-on webs which, with a cage fully embracing a guiding rail, are provided with a number of webs corresponding to half the number of ball rows which, laterally, are provided with guiding recesses for guiding the balls in the carrying portions, or which, with the cage only partially embracing a guiding rail, are provided with a number of webs corresponding to half the number of ball rows increased by the figure one, two of which webs comprise only one guiding recess, with the others comprising two guiding recesses.

According to a third embodiment, the cage is formed of both types of inner segments, with the first inner segments comprising the guiding groove of the returning portion of a ball row, the second inner segments the guiding grooves of the returning portions of two ball rows and with the first and second inner segments as well as the head pieces comprising mutually complementary guiding recesses for forming the carrying portions and deflecting portions.

If the cage is designed in this way and if the cage fully embraces the guiding rail, two webs are provided with two guiding recesses for the balls contained in two adjoining carrying portions. If the cage partially embraces the guiding rail, three webs are provided, one of which comprises two guiding recesses for the balls of two adjoining carrying portions, and the other two webs each comprise one guiding recess for the balls of a carrying portion adjacent to the slot.

The webs of the head pieces preferably extend along half the length of the basic member so that along their whole length—when they are inserted by the end faces of the basic member—they complement each other to form a continuous web.

For holding the cage in the basic member, the inner segments are provided with radial projections by means of which they engage correspondingly formed recesses or apertures of the basic member. The same applies to the webs of the head pieces.

As the cage and head pieces are preferably produced from plastics by injection molding, the inner segments and head pieces should be connected to each other by centering bars in order to improve stability. These centering bars are preferably inserted into bores of the inner segments and head pieces, which bores extend parallel to the longitudinal axis. For centering the head pieces at the basic member, they are, at their ends, covered by caps centered at the ends of the basic member. The centering bars are fixed at the caps. Axial connection and stability and increased strength of the unit are ensured by these centering bars which are fixed to the caps by welding, caulking or bolting.

Maximum strength and cage stiffness are achieved if the centering bars are arranged in the webs of the head pieces or between the two adjoining guiding grooves of the inner segments.

Mutual guidance of the head pieces and inner segments may also, or additionally, be achieved by providing mutually complementary centering means.

In a preferred embodiment, the head pieces are provided with axially extending centering projections, with the inner segments being provided with corresponding centering recesses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 shows different sections of details of FIG. 1; i.e.:

FIG. 15 shows various sections of details of FIG. 14, i.e.

DETAILED DESCRIPTION OF PREFERRED EMBODIMENT

Figure 1:
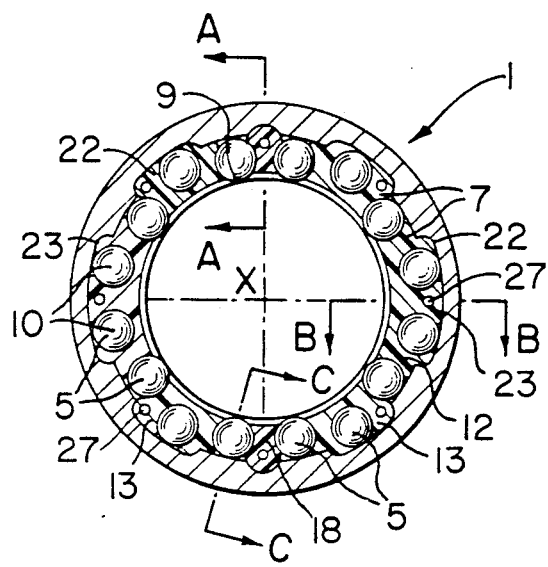
FIG. 1 shows a first embodiment of the ball circulation unit with a cage comprising both types of inner segments and with a closed basic member fully embracing the guiding rail.
Figure 3A:
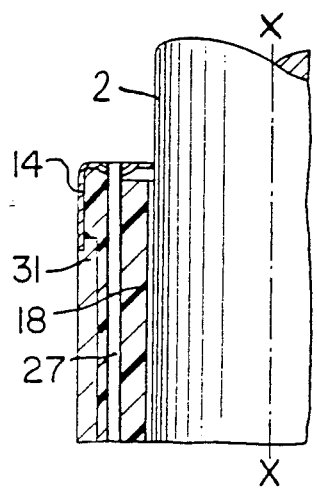
FIG. 3a a section A—A according to FIG. 1.
Figure 3C:
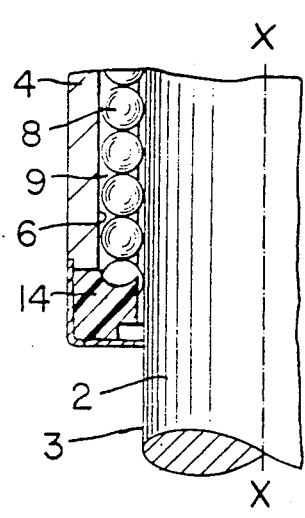
FIG. 3c a section C—C according to FIG. 1.
Figure 3B:
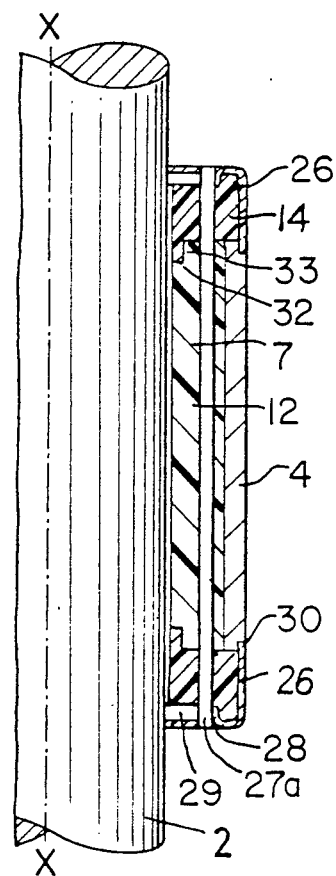
FIG. 3b a section B—B according to FIG. 1.
Figure 10:
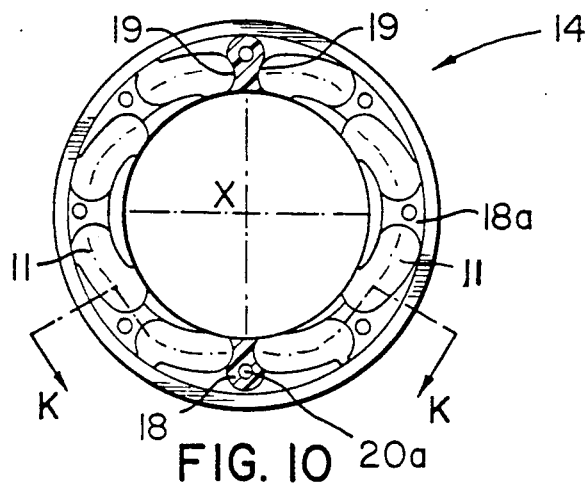
FIG. 10 shows a view of the end face of a head piece with a slotted web according to section L—L of FIG. 11 for a ball circulation unit according to FIG. 1.

FIGS. 1 and 3 illustrate a ball circulation unit 1 which comprises a guiding rail 2 extending across its entire cross-section. The outer face 3 of the guiding rail is contacted by balls 8 of ball rows 5 contained in carrying portions 9. The balls 8 of the ball rows 5 are held by a cage 7. In the carrying portion 9, i.e. the portion from which the balls 8 project radially inwardly from the cage 7, the balls 8 are supported on the outer face 3 of the guiding rail 2, on the one hand, and on the inner race 6 of a basic member 4, on the other hand (see FIG. 3a). The ball rows 5 are formed by carrying portions 9, returning portions 10, and deflecting portions 11 which connect the carrying portions 9 and the returning portions 10 at the ends of the basic member 4. In the deflecting portions 11—as can be seen in FIG. 10—the balls 8 are guided radially outwardly away from the outer face 3 of the guiding rail 2. The balls 8 are guided with play in the returning portions 10. The ball rows 5 each form a continuous row, and it can be seen that in the case of the embodiment of FIG. 1, two pairs of ball rows 5 are arranged at a smaller circumferential distance from each other than the carrying portions 9 of these pairs of ball rows 5 relative to the circumferentially following carrying portions 9 of subsequent ball rows 5.

In the case of the embodiment of FIGS. 1 and 3, the cage 7 is formed of two types of inner segments 12, 13 and two head pieces 14.

Figure 4:
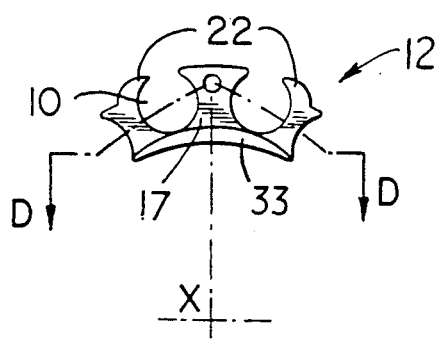
FIG. 4 shows a lateral view of an inner segment with two returning portions according to the direction of the arrow F of FIG. 6.
Figure 7:
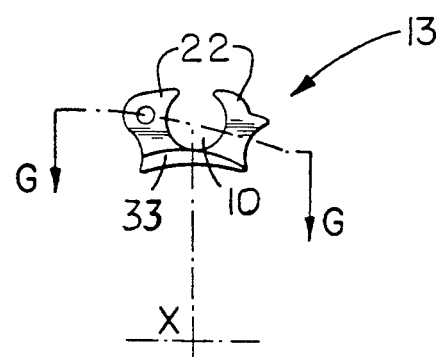
FIG. 7 shows a lateral view according to the direction of arrow J of FIG. 9 of an inner segment with only one returning portion.
Figure 5:
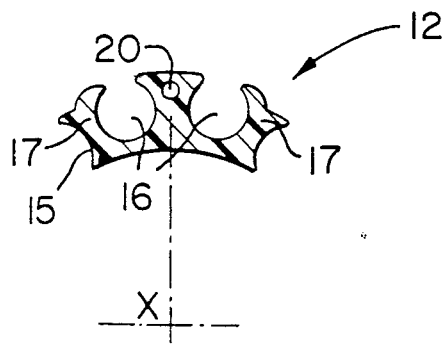
FIG. 5 shows a section E—E according to FIG. 6.
Figure 8:
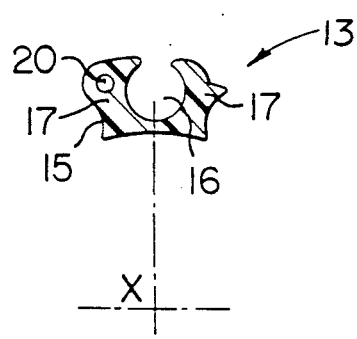
FIG. 8 shows a section H—H according to FIG. 9.
Figure 6:
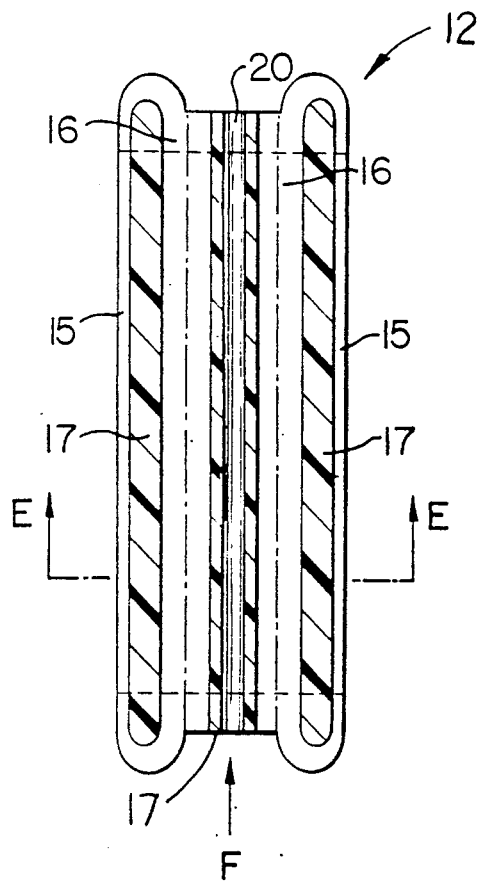
FIG. 6 shows a section D—D according to FIG. 4.
Figure 9:
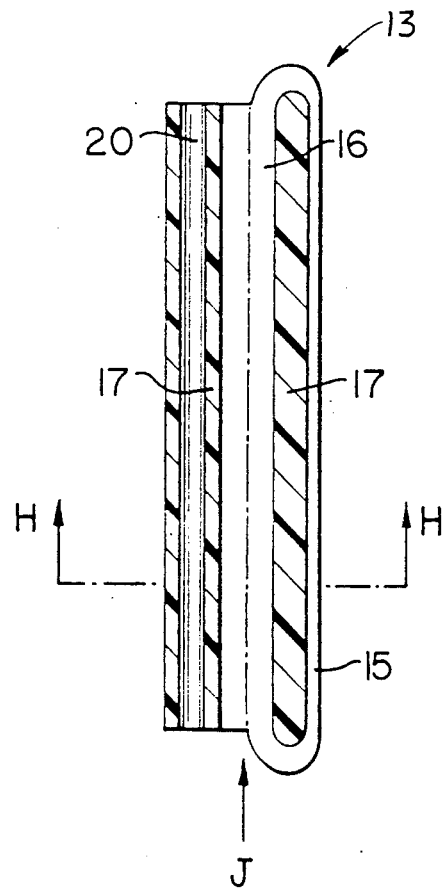
FIG. 9 shows a section G—G according to FIG. 7.

The first type of inner segment 13 is shown in FIGS. 7 to 9, and one inner segment 12 of the second type is illustrated in FIGS. 4 to 6. It can be seen that in the embodiment of FIG. 1 there are provided a total of four first inner segments 13 and two second inner segments 12. The first inner segments 13 and the second inner segments 12 are arranged so as to alternate. The first inner segment 13 comprises only one guiding groove 16 which forms the returning portion 10 of a ball row 5. The first inner segments 13 additionally comprise two lateral guiding recesses 15 which serve to hold and guide the balls 5 in the carrying portions 9. The guiding grooves 16 for the returning portions 10 are formed laterally by segment webs 17. One of the segment webs 17 also comprises a bore 20 which extends parallel to the guiding axis of the guiding grooves 16, and to the longitudinal axis X. At the ends of the inner segments 13, the guiding groove 16 is continued and passes into the guiding recess 15. This semi-circular connection, together with the head pieces 14 of the cage 7 yet to be described, forms the deflecting portions 11.

Figure 11:
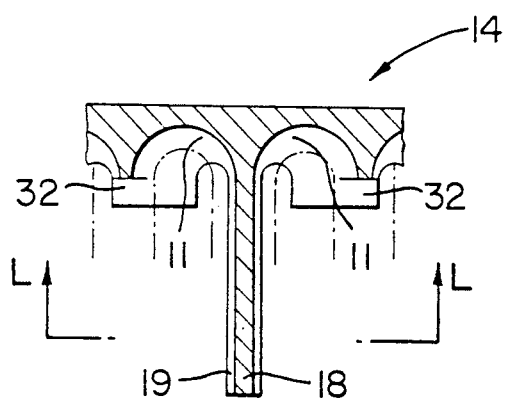
FIG. 11 shows a section K—K according to FIG. 10.

In accordance with FIG. 1, the second inner segments 12, one of which is shown in FIGS. 4 to 6, are arranged between the first inner segments 13. The second inner segments 12 comprise two guiding grooves 16 for two ball rows 5. Between the two guiding grooves 16 there has also been provided a central segment web 17. At the sides, there have been arranged further limiting segments 17 which contain the guiding recesses 15 for guiding the balls 8 contained in the carrying portions 9 of the ball rows 5. The central segment web 17 also comprises a through-bore 20 extending parallel to the axis X and the axis of the guiding grooves 16. At the axial ends of the second inner segments 12, between the guiding grooves 16 and the associated guiding recesses 15, there are provided semi-circular recesses which, together with the respective recesses of the head pieces 14, according to FIGS. 10 and 11, form the deflecting portions 11.

In the case of the embodiment according to FIG. 1, the first and second inner segments 13, 12 are provided with radial projections 22 by means of which they are received in recesses 23 extending parallel to the axis X in the basic member 4. In this way, a non-rotating connection is achieved between the basic member 4 and the inner segments 12, 13. The head pieces 14 are inserted from the direction of the end faces of the basic member 4.

The head pieces 14 and inner segments 13, 12 are centered relative to each other. For this purpose, the inner segments 12, 13 comprise centering recesses 33 into which there project matching centering projections 32 of the head pieces 14. The head pieces 14 comprise webs 18 extending along the longitudinal axis X approximately over half the length of the basic member 4 and mutually complementing each other. They abut at their end faces. At their radially outer face, the webs 18 are adapted to the shape of the recess 25 of the basic member 4. The webs 18, at their sides in the direction of the balls 5 of the carrying portions 9, comprise guiding recesses 19 which partially embrace the balls 8 and which, together with the guiding recesses 15 of the inner segments 13 following in the circumferential direction, hold the balls 8 and secure them against radially falling out inwardly when the ball circulation unit is in an unassembled condition, i.e. when it is not yet mounted on a guiding rail 2. The guiding recesses 19 of the head pieces pass into recesses forming the deflecting portions 11.

The head pieces 14 also comprise bores 20a extending through their webs 18 as well as bores 18a arranged in the remaining region extending in a flange-like way which are arranged to correspond to the bores 20 of the inner segments 12, 13. The head pieces 14 are covered by caps 26 which are made of plate metal, for example, and are centered on a centering face 30 of the basic member. With their end edges the caps 26 are axially supported on corresponding steps 31 of the basic member 4. The caps 26 comprise bores 28 corresponding to the bores 20, 18a and 20a in the inner segments 12, 13 and head pieces 14, respectively. Centering bars 27 have been inserted into all the above-mentioned bores, and are fixed in the bores 28 of the caps 26. The ends 27a of the centering bars 27 projecting from the bores 28 of the caps 26 are secured by caulking or welding, for example.

The caps 26 additionally serve to hold seals 29 outwardly sealing the ball circulation unit 1 relative to the outer face 3 of the guiding rail 2. The centering bars 27 ensure mutual alignment of the inner segments 12, 13 and webs 18 of the head pieces 14 and increase the strength of the cage 7 assembled from these components.

Figure 2:
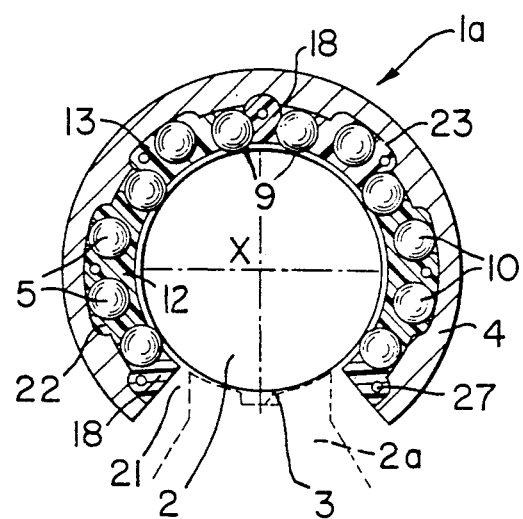
FIG. 2 shows a second embodiment of the ball circulation unit in the case of which the basic member only partially embraces the rail with the circular cross-section, with the cage again comprising both types of inner segments.
Figure 12:
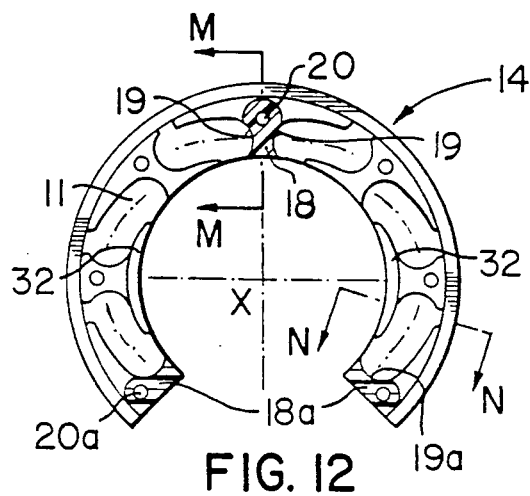
FIG. 12 shows a section O—O according to FIG. 13 through a head web for a ball circulation unit according to FIG. 2.
Figure 13A:
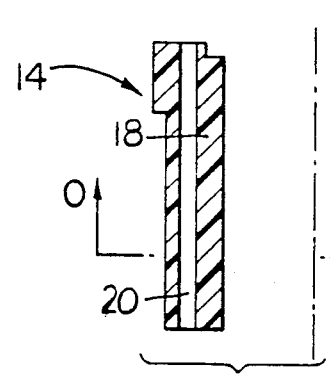
FIG. 13a shows a section M—M according to FIG. 12.
Figure 13B:
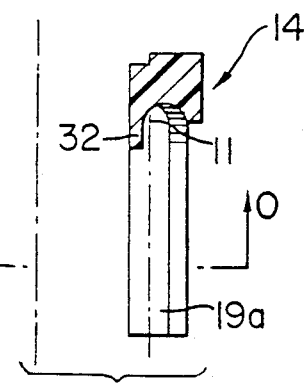
FIG. 13b shows a section N—N according to FIG. 12.

FIG. 2 shows an alternative embodiment of a ball circulation unit 1a. This embodiment comprises a basic member 4 which is slotted, with the guiding rail 2 being embraced only partially. The slot of the basic member has been given the reference number 21. The guiding rail 2 is attached to a fixing element 2a which in turn may be fixed to a base. In total, there are only six ball rows 5. There are provided two first inner segments 13 and two second inner segments 12 which, as described in connection with FIG. 1, have been designed like those shown in FIGS. 7 to 9 and 4 to 6, respectively. In view of this arrangement, the head pieces 14 have a different design which is illustrated in FIGS. 12 and 13. The head pieces 14 only cover the segment portion, and comprise a web 18 projecting between the carrying portions 9 of two ball rows 5 forming a pair. Furthermore, for limiting purposes in the direction of the slot 21 of the basic member 4, the head pieces 14 each comprise two semi-webs 18a each comprising only one guiding recess 19a.

Figure 14:
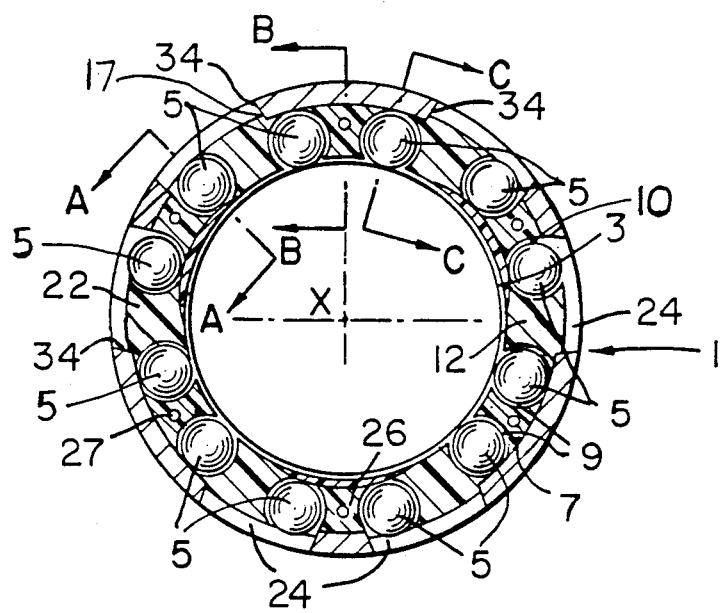
FIG. 14 shows an alternative embodiment of a ball circulation unit with a cage assembled only of inner segments with two guiding grooves.
Figure 15A:
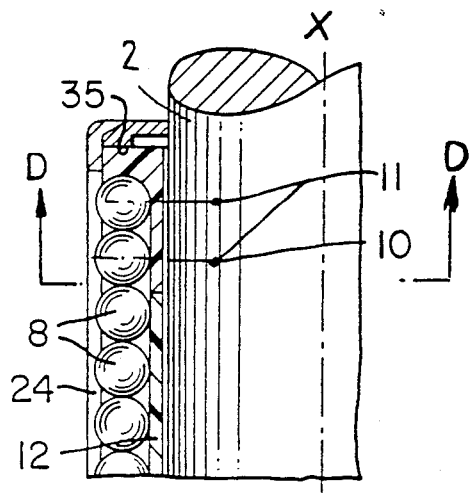
FIG. 15a a section A—A according to FIG. 14 (left-hand upper half of FIG. 15)
Figure 15B:
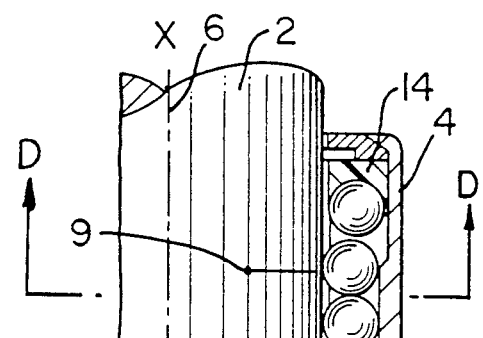
FIG. 15b a section C—C according to FIG. 14 (right-hand half of FIG. 15)
Figure 15C:
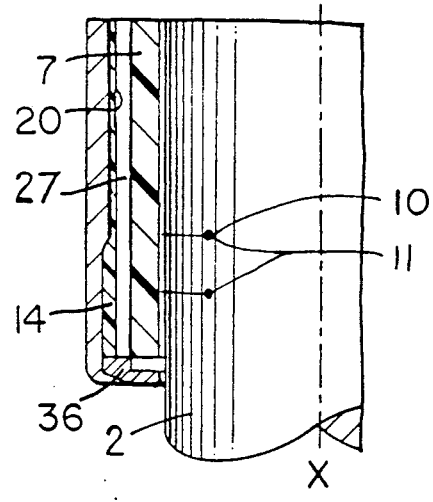
FIG. 15c a section B—B according to FIG. 14 (left-hand lower half of FIG. 15)
Figure 16:
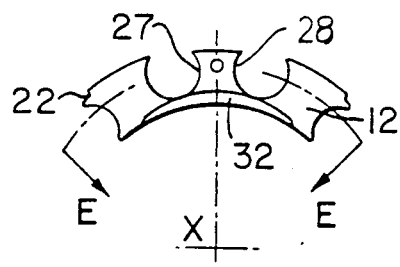
FIG. 16 shows a lateral view of an inner segment according to that of FIG. 4, but showing securing projections in a basic member provided with apertures.

The ball circulation unit 1 according to FIGS. 14 to 16 is movable via balls along the outer faces 3 of a guiding rail 2 with a circular cross-section.

Movement is effected along the longitudinal axis X of the guiding rail 2 which at the same time represents the longitudinal axis for the ball circulation sleeve 1. The ball circulation sleeve 1 consists of a basic member 4 designed as a sleeve, and the balls 8 guided in the cage 7. There are a total of six ball rows 5 distributed on the circumference of the cross-section of the guiding rail 2. Each individual ball row 5 comprises a carrying portion 9 into which the balls 8 from the cage 7 project radially inwardly, while resting against the outer face 3 of the guiding rail 2; a returning portion 10 in which the balls 8 are lifted off the outer face 3 and in which they may circulate in a load-free way; and deflecting portions 11 connecting the ends of the carrying portion 9 and returning-portion 10. In FIGS. 14 and 15 especially, it can be seen that the returning portions 10 of two adjoining ball rows 5 are arranged so as to be immediately adjacent to each other. Accordingly, looking at the assembly in the clockwise direction, the two carrying portions of the subsequent two ball rows are immediately adjacent to each other. Along the axial extension of the carrying portion 9, the basic member has been provided with a thicker wall and toward the ends it comprises a thinner wall. In the region of the returning portions 10 there are provided apertures 24 which extend parallel to the axis X and into which the balls 8 contained in the returning portions 10 project. The cage 7 consists of three inner segments 12 of the first type and of the head pieces 14. The number of inner segments 12 corresponds to half the number of ball rows 5 provided.

In the present embodiment there have been provided six ball rows 5, and there have to be provided three inner segments 12. The inner segments 12 are substantially designed in accordance with those shown in FIGS. 4 to 12, the only difference being that the inner segments 12, as can be seen from FIG. 16, each comprise projections 22 by means of which they are supported on the limiting faces 34 of the apertures 24 in the two opposite circumferential directions of the basic member 4, if the assembly is viewed in cross-section. As a result, the inner segments 12 are centered relative to the apertures 24. Furthermore, the apertures 24 may be used to cause the balls 8 contained in the returning portions 10 to project radially into these to achieve a more compact design and make use of the radial space.

Figure 17:
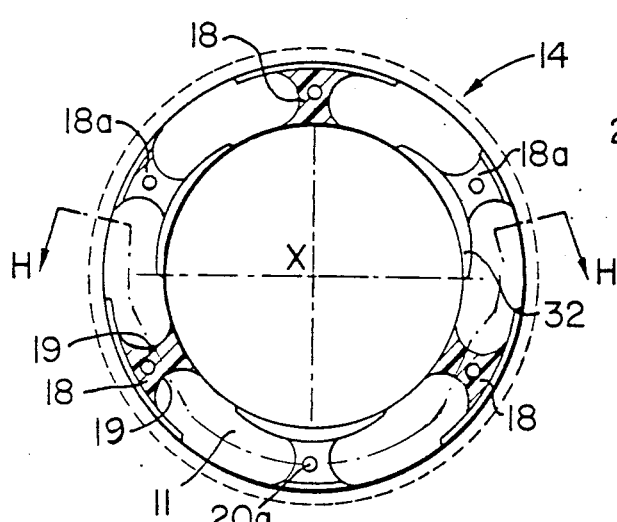
FIG. 17 shows a view of an end face of a head piece for an embodiment according to FIGS. 14 and 15 with sectioned webs according to section J—J of FIG. 18.
Figure 18:
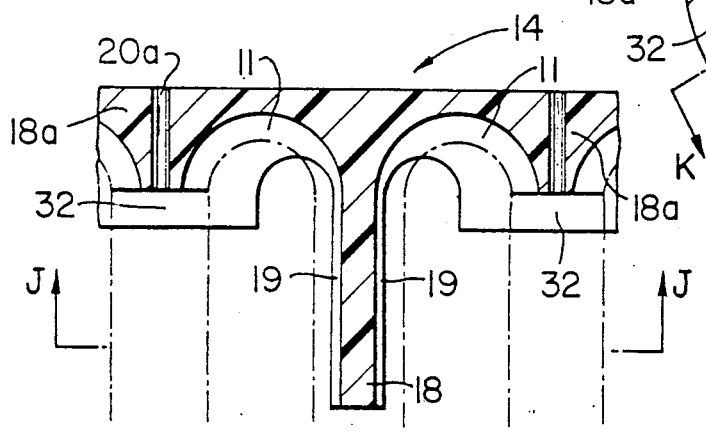
FIG. 18 shows a section H—H according to FIG. 17.

Furthermore, the inner segments 12, at their ends on the inside, comprise centering recesses 33 into which centering projections 32 extend which are associated with the head pieces 14. The design of the head pieces 14 having centering projections 32 is apparent from FIGS. 17 and 18. The two head pieces 14 to be attached to the ends of the inner segments 12 cover the entire circumferential region, i.e. a total of three inner segments 12. At the head end, the centering projections extend into the region of the guiding grooves 16.

The two head pieces 14 further comprise axially projecting webs 18 of a number which corresponds to half the number of ball rows 5 and which extend up to approximately half the length of the inner segments 12 where they abut with their end faces.

The webs 18 also comprise guiding recesses 19 for guiding the balls in the carrying portions 9. Otherwise, there have also been provided centering bars 27 for aligning the head pieces 14 relative to the inner segments 12.

The head pieces 14 are inserted from the aperture ends of the basic member 4. Following the end faces 35 of the head pieces 14 there are inserted holding rings 36 so as to rest against these. The holding rings 36 are fixed in their position by the beaded edge 37 obtained by beading the wall of the basic member 4 and hold together the unit consisting of the basic member 4, the cage 7 and the balls 8. The holding rings 36 may be provided with recesses containing seals 38 sealing the unit relative to the outer face 3 of the guiding rail 2.

Figure 19:
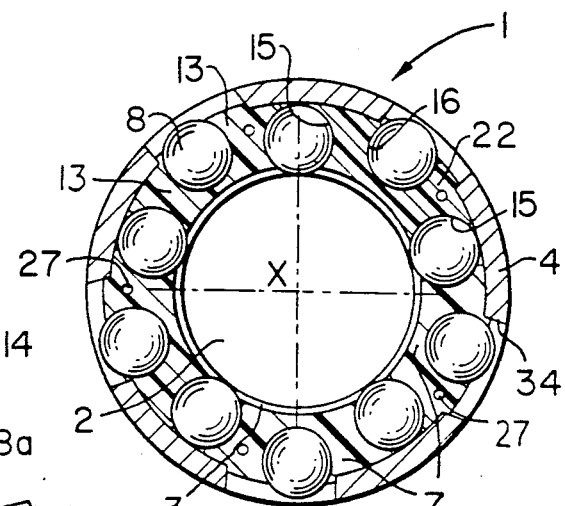
FIG. 19 shows a cross-section through a further embodiment of a ball circulation unit having a cage assembled only of inner segments with on guiding groove.
Figure 20:
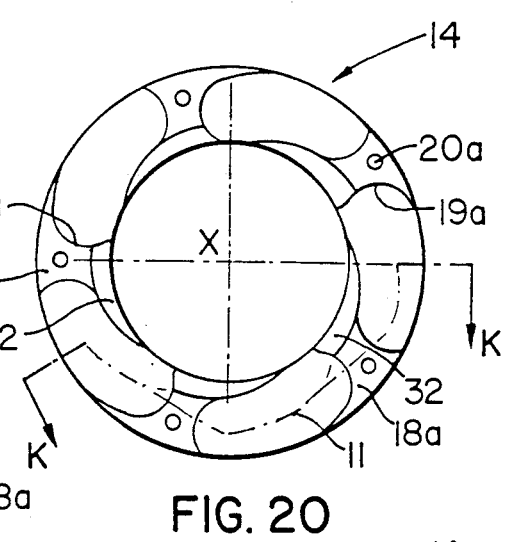
FIG. 20 shows an end view of a head piece for an embodiment according to FIG. 19.
Figure 21:
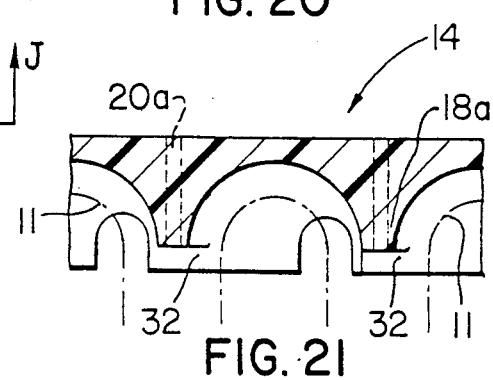
FIG. 21 shows a section K—K according to FIG. 20.

FIGS. 19 to 21 show a further embodiment of a ball circulation unit 1 whose cage 7 exclusively consists of inner segments 13 of the first type which comprise only one guiding groove 16 and lateral guiding recesses 15. The lateral guiding recesses 15 of two circumferentially adjoining first inner segments 13 guide the balls 8 contained in the carrying portions 9 in which the balls 8 project from the cage 7 while resting against the outer face 3 of the guiding rail 2.

The basic member 4 has been provided with apertures 24 in order to achieve a particularly compact design. In contrast to the previously described embodiments, the head pieces 14 of the embodiment according to FIG. 19 are not provided with webs but with a smooth end face resting against the end faces of the inner segments 13. Again, centering bars 27 inserted into bores have been provided for connecting purposes. Furthermore, the inner segments 13 and the head pieces 14, like the previously described head pieces, comprise centering projections 32 and corresponding centering recesses 33, respectively.

While the invention has been illustrated and described as embodied in a ball circulation unit for a linear ball guide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. A ball circulation unit for a linear ball guide, which is movable along a guiding shaft with a circular cross-section, and at least partially embraces it, the unit comprising several continuous rows of balls which are distributed across the cross-section and which are guided in a cage; a carrying portion in which the balls, from the cage, project radially inwardly while resting on the guiding shaft; a returning portion; and deflecting portions connecting the carrying portion and returning portion at their ends, the carrying portion and returning portion each extending parallel to the longitudinal axis of the shaft, and the cage being fixed in the circumferential direction and axially in a basic member, the cage (7) being made up of several parts, including inner segments (12, 13) which represent guiding means for the carrying portions (9) and returning portions (10), and head pieces (14) attached at the axial ends of the inner segments and comprising the deflecting portions (11), the inner segments (12, 13), in the circumferential direction, on both sides, comprise an axially extending guiding recess (15) of a carrying portion (9) and, therebetween, at least one guiding groove (16) forming at least one returning portion (10), the head pieces (14) and inner segments (12, 13) being centered relative to each other.

2. A ball circulation unit according to claim 1, wherein the cage (7) comprises only inner segments (13) with one guiding groove (16).

3. A ball circulation unit according to claim 1, wherein the cage (7) comprises inner segments (12) with two guiding grooves (16) and head pieces (14) with formed-on webs (18, 18a) which, with the cage (7) fully embracing the guiding shaft (2), are provided with a number of webs (18) corresponding to half the number of ball rows (5) which, laterally, are provided with guiding recesses (19) for guiding the balls (8) in the carrying portions (9).

4. A ball circulation unit according to claim 1, wherein the inner segments (12, 13), include first inner segments (13) comprising the guiding groove (16) of the returning portion (10) of a ball row (5), and second inner segments (12) comprising the guiding grooves (16) of the returning portions (10) of two ball rows (5), the first and second inner segments (12, 13) as well as the head pieces (14) comprising mutually complementary guiding recesses (15, 19, 19a) which form the carrying portions (9) and deflecting portions (11).

5. A ball circulation unit according to claim 4, wherein the cage (7) partially embraces the guiding shaft, and further including two webs (18) provided with two guiding recesses (19) for the balls (8) contained in two adjoining carrying portions (9), and two other webs (18a) each comprise a guiding recess (19a) for the balls (8) of a carrying portion (9) adjoining the slot.

6. A ball circulation unit according to claim 1, wherein the inner segments (12, 13) have radial projections (22) by means of which the inner segments engage correspondingly formed supporting recesses (23) or apertures (24) in the basic member (4).

7. A ball circulation unit according to claim 1, and further comprising centering bars (27) arranged so as to connect the inner segments (12, 13) and head pieces (14) to each other.

8. A ball circulation unit according to claim 7, wherein the centering bars (27) are inserted into bores (20, 20a) of the inner segments (12, 13) and head pieces (14), which bores extend parallel to the longitudinal axis (X).

9. A ball circulation unit according to claim 7, and further comprising caps (26) provided so as to cover the head pieces (14) at their ends, and centered at the ends of the basic member (4).

10. A ball circulation unit according to claim 9, wherein the centering bars (27) are fixed at the caps (26).

11. A ball circulation unit according to claim 10, wherein the centering bars (27) are fixed to the caps (26) by one of welding, caulking and bolting.

12. A ball circulation unit according to claim 7, wherein the head pieces (14) have webs (18, 18a), the centering bars (27) being arranged in the webs (18, 18a) of the head pieces (14).

13. A ball circulation unit according to claim 7, wherein the centering bars (27) are arranged between the two adjoining guiding grooves (16) of the inner segments (12).

14. A ball circulation unit according to claim 1, wherein the head pieces (14) and inner segments (12, 13) are provided with mutually complementary centering means (32, 33).

15. A ball circulation unit according to claim 14, wherein the head pieces (14) are provided with axially extending centering projections (32), and the inner segments (12, 13) are provided with corresponding centering recesses (33).

16. A ball circulation unit according to claim 1, wherein the cage (7) comprises inner segments (12) with two guiding grooves (16) and head pieces (14) with formed-on webs (18, 18a) which, with the cage (7) only partially embracing the guiding shaft (2), are provided with a number of webs (18, 18a) corresponding to half the number of ball rows (5) increased by the figure one, two of which webs (18a) comprise only one guiding recess (19a), with the others comprising two guiding recesses (19)

the cage (7) being made up of several parts, including inner segments (12, 13) which represent guiding means for the carrying portions (9) and returning portions (10), and head pieces (14) attached at the axial ends of the inner segments and comprising the deflecting portions (11), the inner segments (12, 13), in the circumferential direction, on both sides, comprise an axially extending guiding recess (15) of a carrying portion (9) and, therebetween, at least one guiding groove (16) forming at least one returning portion (10), the head pieces (14) and inner segments (12, 13) being centered relative to each other.

* * * * *